United States Patent
Hornsey

(10) Patent No.: US 7,299,051 B2
(45) Date of Patent: Nov. 20, 2007

(54) METHOD AND APPARATUS FOR FREQUENCY PLANNING IN A CELLULAR COMMUNICATIONS SYSTEM USING MODIFIED NEIGHBOUR LISTS

(75) Inventor: Andrew Hornsey, Swindon (GB)

(73) Assignee: Motorola, Inc., Schaumburg, IL (US)

( * ) Notice: Subject to any disclaimer, the term of this patent is extended or adjusted under 35 U.S.C. 154(b) by 279 days.

(21) Appl. No.: 10/541,098

(22) PCT Filed: Jan. 22, 2004

(86) PCT No.: PCT/EP2004/050036

§ 371 (c)(1),
(2), (4) Date: Jun. 28, 2005

(87) PCT Pub. No.: WO2004/066655

PCT Pub. Date: Aug. 5, 2004

(65) Prior Publication Data

US 2006/0293059 A1    Dec. 28, 2006

(30) Foreign Application Priority Data

Jan. 22, 2003  (GB) ................................ 0301546.8

(51) Int. Cl.
*H04Q 7/00* (2006.01)
(52) U.S. Cl. ...................... 455/447; 455/450; 455/423; 455/509; 455/517; 455/561; 370/329
(58) Field of Classification Search ............. 455/422.1, 455/450–452.2, 446–447, 423, 509, 512–513, 455/517, 424, 524–525, 560–561; 370/322, 370/329, 330, 341, 348, 338
See application file for complete search history.

(56) References Cited

U.S. PATENT DOCUMENTS

| 5,701,585 | A  |   | 12/1997 | Kallin et al. |         |
|-----------|----|---|---------|---------------|---------|
| 5,828,963 | A  | * | 10/1998 | Grandhi et al. | 455/450 |
| 5,854,981 | A  | * | 12/1998 | Wallstedt et al. | 455/439 |
| 6,125,280 | A  | * | 9/2000  | Grandhi et al. | 455/450 |
| 6,175,734 | B1 | * | 1/2001  | Desgagne et al. | 455/437 |
| 6,192,244 | B1 | * | 2/2001  | Abbadessa     | 455/436 |

(Continued)

FOREIGN PATENT DOCUMENTS

GB          2 376 605 A      12/2002

(Continued)

*Primary Examiner*—George Eng
*Assistant Examiner*—Kamran Afshar

(57) ABSTRACT

A method, and apparatus for, determining frequency planning measurement data in a cellular communications system (1), comprising: allocating neighbor lists (208, 210, 212) to provide measurement data for frequency planning; wherein the neighbor lists (208, 210, 212) are allocated on a per call basis. Thus different neighbor lists (208, 210, 212) may be allocated by the same base station (28) to different mobile stations (44, 46, 48) for respective calls (204) that overlap in time. A different neighbor list (208, 210, 212) may be allocated for substantially each call (204) conducted by a base station (28) of the cellular communication system (1), compared to respective directly preceding calls or may be allocated for substantially each of a predetermined number of calls conducted by a base station (28) of the cellular communications system (1), compared to the predetermined number of directly preceding calls. At least substantially all test frequencies (206) for the cell (16) served by the base station (28) may thereby be covered over a plurality of calls (204).

4 Claims, 2 Drawing Sheets

U.S. PATENT DOCUMENTS

| | | | |
|---|---|---|---|
| 6,285,874 B1 * | 9/2001 | Magnusson et al. | 455/446 |
| 6,442,387 B1 * | 8/2002 | Silventoinen et al. | 455/436 |
| 6,496,700 B1 * | 12/2002 | Chawla et al. | 455/452.2 |
| 6,928,286 B2 * | 8/2005 | Stegemann | 455/447 |
| 6,944,146 B1 * | 9/2005 | Barany et al. | 370/338 |
| 6,965,587 B2 * | 11/2005 | Cho et al. | 455/450 |
| 6,973,312 B1 * | 12/2005 | Ngan et al. | 455/442 |
| 6,990,348 B1 * | 1/2006 | Benveniste | 455/447 |
| 7,027,418 B2 * | 4/2006 | Gan et al. | 370/329 |
| 7,050,803 B2 * | 5/2006 | Celedon et al. | 455/436 |

FOREIGN PATENT DOCUMENTS

| | | |
|---|---|---|
| WO | WO 99/02004 A | 1/1999 |

* cited by examiner

NEIGHBOR POSITION

| CALL NUMBER | 1 | 2 | 3 | 4 | 5 | 6 | 7 | 8 | 9 | 10 | 11 | 12 |
|---|---|---|---|---|---|---|---|---|---|---|---|---|
| 1 | 1 | 3 | 4 | 7 | 12 | 17 | 2 | 5 | 6 | 8 | 13 | 14 |
| 2 | 1 | 3 | 4 | 7 | 12 | 17 | 15 | 16 | 18 | 19 | 2 | 5 |
| 3 | 1 | 3 | 4 | 7 | 12 | 17 | 6 | 8 | 13 | 14 | 15 | 16 |

FREQUENCY

| CALL NUMBER | 1 | 3 | 4 | 7 | 12 | 17 | 2 | 5 | 6 | 8 | 13 | 14 | 15 | 16 | 18 | 19 |
|---|---|---|---|---|---|---|---|---|---|---|---|---|---|---|---|---|
| 1 | X | X | X | X | X | X | X | X | X | X | X | X | | | | |
| 2 | X | X | X | X | X | X | X | X | | | | | X | X | X | X |
| 3 | X | X | X | X | X | X | | | X | X | X | X | X | X | | |

FIG. 3

METHOD AND APPARATUS FOR FREQUENCY PLANNING IN A CELLULAR COMMUNICATIONS SYSTEM USING MODIFIED NEIGHBOUR LISTS

This application claims benefit of the foreign application priority of UNITED KINGDOM application No. 0301546.8 filed on Jan. 22, 2003.

FIELD OF THE INVENTION

The present invention relates to cellular communication systems. The present invention relates in particular, but not exclusively, to data collection for frequency planning for cellular communication systems based on measurement reports. Cellular communications systems to which the present invention may be applied include, for example, Global System for Mobile Telecommunication (GSM), Universal Mobile Telecommunications System (UMTS), and General Packet Radio Service (GPRS) systems.

BACKGROUND OF THE INVENTION

In a cellular communications system, the area over which service is provided is divided into a number of smaller areas called cells. Typically each cell is served from a base transceiver station (BTS) which has an antenna or antennas for transmission to and reception from a large number of user stations, normally mobile stations, e.g. mobile telephones. Examples of established harmonised cellular radio communications systems are Global System for Mobile Telecommunication (GSM) and General Packet Radio Service (GPRS) systems. A further harmonised standard being introduced is the Universal Mobile Telecommunications System (UMTS).

In cellular communication systems, multiple frequency channels are used in each cell, as well as used in different cells. A technique known as frequency hopping is used within cells to provide diversity. The choice of which frequencies are to be used in which cells plays an important role in the efficiency and quality of service in a system. For example, adjoining cells are prone to interfere with each other, so appropriate selection of frequencies may reduce such interference.

However, in order to achieve efficient usage of resources and provide service to large numbers of users, practically it is necessary to employ frequency plans that may involve potential interference. Various methods are known for testing systems to acquire data to enable frequency plans to be improved. One example is drive testing. Another example is to collect data from measurement reports that are anyway produced in the operation of the cellular communication system. Such measurement reports are produced by mobile stations and transmitted to control units of the system infrastructure.

The measurement reports comprise details of e.g. signal strength measured by the mobile station on the frequency or frequencies it is communicating with in its own cell. In addition, the measurement reports comprise similar details of frequencies that correspond to certain neighbouring cells. The mobile station is informed of which frequencies (and in effect which neighbouring cells) to measure and report by virtue of these being on a so-called neighbour list, determined by a control unit of the infrastructure of the system and communicated to the user station. The neighbour list is primarily provided to enable preparation for handover; however of interest here is the fact that measurements of the neighbouring cells and frequencies can be used in frequency planning.

In GSM systems, the neighbour list is transmitted to the mobile stations on a control channel called the Slow Associated Control Channel (SACCH), and hence the neighbour list may conveniently be called a SACCH neighbour list. Neighbours included for the primary purpose of potential handover planning are known as configured neighbours. For the purpose of providing measurement reports for collecting data for frequency planning, extra measurement frequencies are added to the SACCH neighbour list. The extra frequencies are known as test frequencies or test neighbours.

Conventionally, the same SACCH neighbour list is transmitted to all user stations in a given cell. Also, conventionally, the test frequencies employed in a given cell are changed once a day, so that over the course of a number of days all the frequencies it is desired to test may be included.

In each system there is a predetermined limit as to the total number of neighbour cells/frequencies that may be set. In GSM this limit is 32. However, there may be a large number of configured neighbours in a given cell, leaving only a small number of test frequencies that may be employed each day. Thus, the conventional approach is often slow and inefficient.

Moreover, by requiring different test frequencies to be tested on different days, the resulting data may not be properly representative of the real life situation, as statistical affects due to different communications traffic on different days may distort the results.

SUMMARY OF THE INVENTION

In a first aspect, the present invention provides a method of determining frequency planning measurement data in a cellular communications system, as claimed in claim 1.

In a further aspect, the present invention provides apparatus for determining frequency planning measurement data in a cellular communications system, as claimed in claim 3.

The present invention tends to improve the quality of the data collected, by recording data for more frequencies over a shorter time period.

BRIEF DESCRIPTION OF THE DRAWINGS

Embodiments of the present invention will now be described, by way of example only, with reference to the accompanying drawings, in which:

FIG. 2 shows a table of frequency channels allocated against neighbour positions over the course of three calls; and FIG. 3 is a table showing which of the frequency channels shown in FIG. 2 will have been measured during the calls shown in FIG. 2.

DESCRIPTION OF PREFERRED EMBODIMENTS

Figure 1:
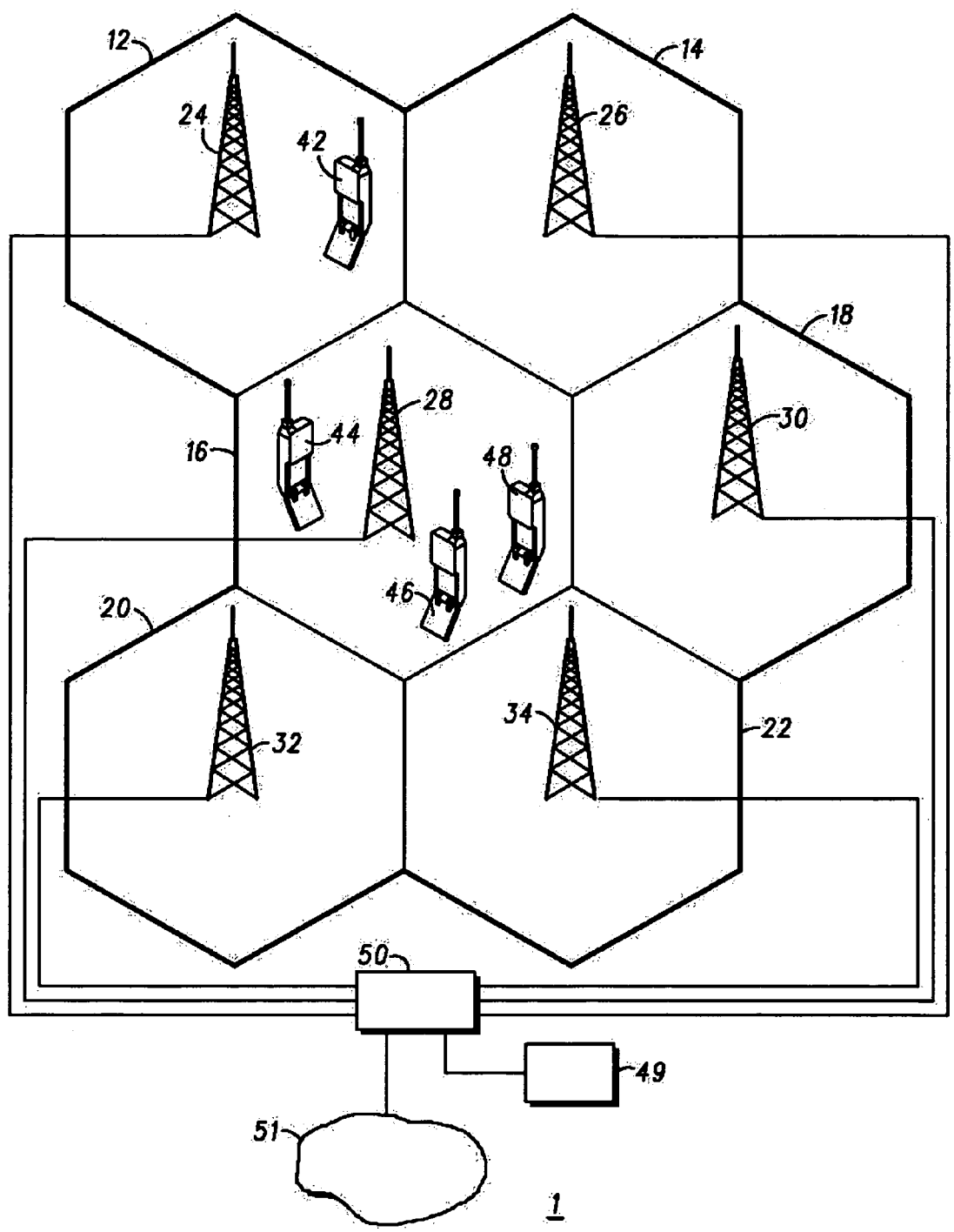
FIG. 1 is a schematic illustration of a small part of a GSM cellular communication system.

FIG. 1 is schematic illustration of a small part of a GSM cellular communication system 1 having a coverage area formed by a number of cells 12-22. A conventional schematic representation showing a hexagonal cell pattern has been used to depict the cell areas, but in practice the shape and size of each cell will be different.

In each cell, there is a base station system (BSS) 24-34. In this embodiment each BSS 24-34 is an integrated base station controller (BSC) and base transceiver station (BTS). In practice large numbers of mobile stations (MSs) will receive service from the infrastructure shown In FIG. 1. However, for clarity, only a few such MSs are shown, namely MSs 42, 44, 46 and 48.

The BSSs 24-34 are each coupled to a Mobile Services Switching Centre (MSC) 50. The MSC 50 is coupled to an Operations and Management Centre (OMC) 49 and to a Public Switched Telephone Network (PSTN) 51.

In operation, the BSSs 24-34 receives radio signals from the MSs and transmits radio signals to the MSs. The MSC 50 provides interconnection and routing, both within the cellular communication system 10 (in co-operation with other MSCs, not shown, covering other areas) and to external elements via the PSTN 51. The OMC 49 is used by the operator of the cellular communication system 1 to configure and maintain the system 1.

Each BSS 24-34 allocates and transmits neighbour lists to MSs receiving service in the corresponding cell. This is implemented by databases and software at the respective BSSs, under instruction from the OMC 49. The neighbour lists are transmitted from the BSSs to the MSs using the Slow Associated Control Channel (SACCH).

In this embodiment, the BSSs 24-34 have been adapted to offer, and provide for, a different way of forming the SACCH neighbour lists, as will be described in more detail below.

However, this adaptation may be implemented in any suitable manner. A new module may be added to a conventional BSS. The module may consist of a single discrete entity added to a conventional BSS, or may alternatively be formed by adapting existing parts of a conventional BSS, for example by reprogramming of a one or more processors therein. As such the required adaptation may be implemented in the form of processor-implementable instructions stored on a storage medium, such as a floppy disk, hard disk, PROM, RAM or any combination of these or other storage media. Furthermore, whether a separate entity or an adaptation of existing parts or a combination of these, the module may be implemented in the form of hardware, firmware, software, or any combination of these.

It is also within the contemplation of the invention that such adaptation of the means for forming SACCH neighbour lists may alternatively be controlled, implemented in full, or implemented in part, by a module added to or formed by adaptation of any other suitable part of the cellular communication system 1 or other cellular communication systems. For example, this may be implemented instead at separate BTSs or BSCs when the BSSs are of a form comprising separate BTSs and BSCs. As another example, this may be implemented at OMCs, in situations where OMCs of systems can directly implement neighbour lists. Further, in the case of other system infrastructures or layouts, implementation may be at any appropriate system node such as any other appropriate type of base station, base station controller etc. Alternatively various parts of the process and means for forming the adapted neighbour lists can be carried out by various components distributed at different locations or entities within the above described cellular communication system 1 or any other suitable cellular communication network or system.

The way in which, in this embodiment, the BSSs 24-34 form the SACCH neighbour lists will now be described, with reference to FIGS. 2 and 3.

In this embodiment, the BSSs 24-34 each form and allocate SACCH neighbour lists on a per call basis. Thus, in terms of an overview, the SACCH neighbour list is formed and allocated separately each time a call is conducted to/from each MS. In this embodiment, a different SACCH neighbour list is formed for each call in each cell.

This process will now be described by use of a simplified example. FIG. 2 shows a table of frequency channels 206 allocated against neighbour positions 202 over the course of three calls 204 (call numbers 1, 2 and 3 in the table) serviced by BSS 28 with respect to MSs in its cell, i.e. a first call conducted by/for MS 44, a second call conducted by/for MS 46, and a third call conducted by/for MS 48. In this example these calls are taking place at the same time (i.e. overlap in time, although not necessarily starting or ending at the same time), although the process described below may also be applied to different calls at different times.

In this simplified example, for the sake of clarity, only 12 neighbour positions 202, numbered 1-12 are included. However, as mentioned earlier, under GSM a maximum of 32 are usually employed. Thus, in this example, in any neighbour list, only twelve frequencies (i.e. frequency channels) may be included. Also, for the sake of clarity, the number of available frequencies (frequency channels) is limited in this simplified example to sixteen, made up of the eight frequencies called 1-8 in FIG. 2 and the eight frequencies called 12-19 in FIG. 2. In this example, the frequencies 1-8 and 12-19 are used to indicate how there are usually gaps in the frequency channels employed, e.g. here frequencies 9-11 are unavailable.

In this example, for the first call, the BSS 28 forms, allocates and transmits (to the MS 44 conducting the first call) a first neighbour list 208. The first neighbour list 208 comprises configured frequencies 1, 3, 4, 7, 12 and 17 in neighbour positions 1 to 6 respectively. (Strictly speaking, these are the Broadcast Control Channel (BCCH) parts of the frequency entries in the neighbour list, which in full also include Base Transceiver Station Identity Code (BSIC) parts. However, such details are well known to the skilled person in the art of cellular communications systems, in particular GSM, and need not be described further here for the purpose of explaining the present invention.) The first neighbour list 208 further comprises test frequencies 2, 5, 6, 8, 13 and 14 in neighbour positions 7 to 12 respectively.

For the second call, the BSS 28 forms, allocates and transmits (to the MS 46 conducting the second call) a second neighbour list 210. The second neighbour list 210 comprises configured frequencies 1-4, 3-5, 4-7, 74, 124 and 17-3 in neighbour positions 1 to 6 respectively. These are the same configured frequencies/neighbour positions as in the first neighbour list 208. However, the second neighbour list 210 further comprises test frequencies 15, 16, 18, 19, 2 and 5 in neighbour positions 7 to 12 respectively i.e. overall the second neighbour list 210 is different to the first neighbour list 208.

For the third call, the BSS 28 forms, allocates and transmits (to the MS 48 conducting the third call) a third neighbour list 212. The third neighbour list 212 comprises configured frequencies 1-4, 3-5, 4-7, 7-4, 12-4 and 17-3 in neighbour positions 1 to 6 respectively. These are the same configured frequencies/neighbour positions as in the first neighbour list 208 and the second neighbour list 210. However, the third neighbour list 212 further comprises test frequencies 6, 8, 13, 14, 15 and 16 in neighbour positions 7 to 12 respectively i.e. overall the third neighbour list 212 is different to both the first neighbour list 208 and the second neighbour list 210.

Thus, for each of the three calls, a different neighbour list is employed.

A benefit of the frequency allocation described above with reference to FIG. 2 may be seen with reference to FIG. 3. FIG. 3 is a table showing which of the above described frequencies 206 will have been measured during the above described calls 204 (this is indicated in FIG. 3 by an "X" in each case). As can be seen, all 16 frequencies (i.e. 1-8 and 12-19) will have been measured. This is in contrast to the fact that if the same neighbour list has been used for all three calls (as per the prior art), only some of the frequencies would have been measured. (Of course, in some applications, not all frequencies will be measured, however there will still tend to be an advantageous increase in the number of frequencies measured compared to the number measured with a common unchanging neighbour list.)

In the above described embodiment, a different SACCH neighbour list is formed for each call in each cell. However, there are a number of ways in which a less extreme variation is employed, whilst still making effective use of the concept of forming and allocating the SACCH neighbour list on a per call basis.

For example, it may be that all possible combinations are tested in a given time before it is wished to stop testing. In this case some or all of the transmitted combinations may be used again.

As another example, a subset of combinations of neighbour lists may be provided which are believed to cover all variables required to be assessed, and these may be repeated on a cyclical basis.

As another example, the process may be applied to substantially all calls, but not absolutely all calls. Calls may be omitted from variation of neighbour list for any one or any combination of reasons, for example certain calls may be excluded due to processing limitations, random errors, requirement to provide a constant neighbour list for some other reason, and so on. Another possibility is calls to certain MSs may be excluded from variation.

As another example, the process may be applied to some but not all the cells of the cellular communications system.

As another example, the process may be applied for some period or periods during the day, but not all day.

As another example, the neighbour list may be varied for plural numbers of calls rather than every call. For example, a given neighbour list may be used for two calls, then changed to a new list used for a further two calls, and so on. Any appropriate number of calls for such a regime (i.e. as opposed to every one or every two calls) may be used according to the requirements of the particular system or situation under consideration.

Also, any two or more of the above examples may occur in combination.

Thus, the terminology "on a per call basis" as used herein is to be understood as encompassing different ways of varying the neighbour lists according to different calls being serviced, rather than being independent of calls, and rather than being uniformly implemented irrespective of which calls are being processed.

Although the above embodiment has been described in terms of a GSM system, it will be appreciated that the present invention may be embodied in any suitable cellular communications system in which neighbour positions, or equivalent characteristics, may be used to provide measurement data for frequency planning.

The present invention may in appropriate circumstances provide, inter alia, one or more of the following advantages:

the data collection time required to provide a given amount of useful input for frequency planning is reduced;

the total amount of data required to be collected to provide a given amount of useful input for frequency planning is reduced;

reduced data analysis time;

reduced hardware and software requirements to process data due to less data;

reduction in cycle time required to provide a given amount of useful input for frequency planning, thereby providing more representative frequency data corresponding more closely to actual cell traffic.

The invention claimed is:

1. A method of determining frequency planning measurement data in a cellular communications system using different neighbor lists allocated to different mobile stations, comprising the steps of:

allocating different test frequencies in the different neighbor lists for substantially each call conducted by a base station of the cellular communication system;

wherein the different neighbor lists are allocated to different mobile stations on a per call basis to cover, over a plurality of calls, substantially all the test frequencies for the cell served by the base station; and repeating, on a cyclical basis comprising repeated calls, the allocation of the different neighbor lists on a per call basis covering substantially all the test frequencies;

wherein the different neighbor list is allocated for each of a predetermined number of calls conducted by the base station of the cellular communications system, compared to the predetermined number of directly preceding calls.

2. A method according to claim 1, wherein the different neighbor lists are allocated by the same base station to said different mobile stations for respective calls that overlap in time.

3. An apparatus for determining frequency planning measurement data in a cellular communications system using different neighbor lists allocated to different mobile stations, comprising:

means for allocating different test frequencies in the different neighbor lists for substantially each call conducted by a base station (28) of the cellular communication system wherein the means for allocating the different neighbor lists are adapted to allocate the different neighbor lists to said different mobile stations on a per call basis to cover, over a plurality of calls, substantially all test frequencies for the cell served by the base station; and means for repeating, on a cyclical basis comprising repeated calls, the allocation of the different neighbor lists on a per call basis covering substantially all the test frequencies;

wherein the means for allocating the different neighbor lists are adapted to allocate said different neighbor list for each of a predetermined number of said calls conducted by said base station of the cellular communications system, compared to the predetermined number of directly preceding calls.

4. An apparatus according to claim 3, wherein the means for allocating said different neighbor lists are adapted to allocate said different neighbor lists from the same base station to said different mobile stations for respective calls that overlap in time.

* * * * *